UNITED STATES PATENT OFFICE.

ALEXANDER STROBL, OF NEW YORK, N. Y.

SOLIDIFIED ALCOHOL.

1,277,149.  Specification of Letters Patent.  Patented Aug. 27, 1918.

No Drawing.  Application filed July 20, 1915. Serial No. 40,846.

*To all whom it may concern:*

Be it known that I, ALEXANDER STROBL, a subject of the King of Hungary, and a resident of the city of New York, in the county of New York and State of New York, have invented certain new and useful Improvements in Solidified Alcohol, of which the following is a specification.

The present invention relates to an improved solified alcohol, intended primarily for use in portable stoves, although suitable for other purposes also.

As far as known solidified alcohol has been produced heretofore exclusively from denatured alcohol. The ingredients of denatured alcohol are ethyl alcohol, methyl alcohol, and usually benzin, these ingredients being brought together, for instance, in the following proportions, two wit: ninety parts of ethyl alcohol, ten parts of methyl alcohol, and about one-half part of benzin. As a solidifying agent is usually employed a soap, or a soap and some other ingredients mixed therewith, or an organic compound. It has been found that solid alcohol manufactured from denatured alcohol burns with a flame that deposits soot, after a few minutes burning, on the bottom of the vessel which is to be heated. This property of the solid alcohol heretofore in use is highly objectionable, and has been found by experiments to be due mainly to the ethyl alcohol contained therein.

The main object of the present invention is to obviate the defect mentioned of the solid alcohol heretofore in use, or in other words to produce a solid alcohol which will burn with a perfectly sootless flame.

Broadly speaking, the invention consists in producing a solidified alcohol by using methyl alcohol instead of denatured alcohol, or by substituting part of the denatured alcohol by methyl alcohol. As a solidifying agent, any one of those heretofore used for such purpose may be resorted to, the one herein described being disclosed for purposes of illustration only.

The process of producing solidified alcohol in accordance with this invention may be carried out in several ways, one of the same being the following: One hundred parts of methyl alcohol are mixed with two or three parts of a suitable fatty acid, such as stearic acid. To this is added a solution of caustic soda or sodium hydrate so as to saponify the fatty acid, and convert the mixture into a solid mass. The amount of caustic soda should, preferably, not be sufficient to neutralize all of the stearic acid, but on the contrary a small amount of the latter should be left free. The alcohol is, preferably, first heated, say between 140° and 160° F. so that the stearic acid will more readily dissolve in it. The necessary quantity of caustic soda is then added to the solution. The product is then allowed to cool, whereby the entire mass congeals. In practice it has been found that this solidified alcohol burns with an entirely sootless flame, in contradistinction to the preparations hitherto in use.

Instead of using solely methyl alcohol, part of denatured alcohol heretofore used in such preparations may be substituted by methyl alcohol. It is sufficient to add about forty parts of methyl alcohol to sixty parts of denatured alcohol to obtain a solidified alcohol burning with a sootless flame. Experiments have shown that the larger a percentage of methyl alcohol is used, the more effective mixture will be obtained for the purpose mentioned.

In carrying out the process for obtaining this preparation, for instance forty parts of methyl alcohol are brought together with sixty parts of denatured alcohol, and to this mixture are then added two or three parts of sodium stearate. The sodium stearate is added to the alcohol by heating first the latter, then adding to it first the stearic acid and then caustic soda, or, since sodium stearate dissolves more readily in ethyl alcohol, first a hot solution of denatured alcohol and sodium stearate may be obtained, and into this solution is then poured the methyl alcohol. In this case it is preferable also to have an excess of unneutralized stearic acid.

When the preparations herein described are ignited in a can or stove, the alcohol burns, leaving behind the saponified mass. The free stearic acid melts and forms with the sodium stearate a very thin layer in the bottom of the can, while, if no free stearic acid is present, the residue which is left behind will form a porous bulky mass which fills a big part of the can and some times even rises above the top of the same.

What I claim is:—

1. A product formed of denatured alcohol, methyl alcohol, and a solidifying agent mixed therewith.

2. A product formed of denatured alcohol sixty parts, methyl alcohol forty parts, and sodium stearate about two to three parts.

3. A sootless burning solidified alcohol comprising ethyl and methyl alcohols in about equal proportions and a solidifying agent mixed therewith.

Signed at New York, in the county of New York, and State of New York, this 17th day of July, A. D., 1915.

ALEXANDER STROBL.